United States Patent [19]

Meekins

[11] Patent Number: 5,025,464

[45] Date of Patent: Jun. 18, 1991

[54] PSEUDO-RANDOM SUPPORT STRUCTURE FOR TRANSMISSION GRATINGS

[75] Inventor: John F. Meekins, Springfield, Va.

[73] Assignee: The United States of America as represented by the Secretary of the Navy, Washington, D.C.

[21] Appl. No.: 498,249

[22] Filed: Mar. 15, 1990

[51] Int. Cl.⁵ .............................................. G21K 1/06
[52] U.S. Cl. ..................................... 378/84; 378/145; 350/162.2
[58] Field of Search ................ 378/145, 84; 350/162.2

[56] References Cited

U.S. PATENT DOCUMENTS

4,414,680 11/1983 Kraus .................................. 378/145

Primary Examiner—Craig E. Church
Attorney, Agent, or Firm—Thomas E. McDonnell; Lawrence A. Root

[57] ABSTRACT

A transmission grating in which the vertical supports are equidistantly spaced from each other in each of the horizontal rows but have their positions relative to each vertical support in all of the other rows determined by a pseudo-random integer of the spacings between the grating wires. As a result, all of the artifacts produced by the vertical supports are eliminated from the diffraction plane.

5 Claims, 10 Drawing Sheets

PSEUDO-RANDOM SUPPORT STRUCTURE FOR TRANSMISSION GRATINGS

FIELD OF THE INVENTION

This invention relates generally to transmission gratings used in the extreme ultraviolet and soft X-ray region of the spectrum and, in particular, is concerned with a support structure consisting of horizontal and vertical bars. The positions of the vertical bars are chosen so as to reduce or eliminate a diffraction pattern coincident with that of the grating itself in the diffraction plane.

DESCRIPTION OF THE PRIOR ART

Diffraction gratings of the transmission type for producing spectra have been known for decades. For use in the optical wave band, diffraction gratings generally consist of a number of fine, equidistant and parallel lines ruled on a support such as plate glass or optically worked glass. For use in the EUV and soft X-ray wave band transmission gratings thus comprise, typically, regularly spaced opaque wires (as many as several thousand per millimeter) which have a thickness of only a few microns in width and are supported on each end. Of course, the wire spacing and the width are crucial to the performance of the grating in producing desirable spectra. In such construction, and because of their very small cross-section, the wires are structurally weak, so it becomes important to confine their length so as not to exceed a few tens of microns. Furthermore, to be useful, gratings must be of a size larger than one square centimeter in area. Because of these extremely rigid requirements, a support structure is essential in order to support the wires at intervals not to exceed a few tens of microns. The support structure, itself, must be reasonably rigid. Furthermore, it is not only highly desirable but extremely important that the support structure produce no additional diffraction pattern in the diffraction plane of the grating from which spectral analysis is expected.

Many of the cosmic X-ray sources are apt to be strong emitters of soft X-ray and extreme ultraviolet (EUV) radiation. For the most part, hot stellar coronae are expected to emit optically thin plasma emission, while other types of sources (e.g., hot white dwarf stars, compact X-ray binaries, and active galactic nuclei) are likely to display predominantly continuum emission spectra. In addition, the intervening material has its own spectral character which should appear as lines and edges superposed on the spectra of the cosmic sources. Much of the future growth of X-ray and EUV astronomy will depend on the development of dispersive instruments with resolving powers sufficient to determine Doppler shifts and line profiles as well as to resolve spectral features. Such measurements would greatly improve the current concepts of temperature, density, composition, structure, and dynamics of astrophysical sources and of the intervening material.

Prominent among the many types of dispersive instruments that have been described for astrophysical applications are objective grating spectrometers which incorporate a transmission grating placed between the elements of a grazing-incidence Wolter telescope and the telescope focus. In these designs, the telescope is used not only to concentrate the relatively weak cosmic source radiation, but also works in conjunction with the transmission grating to form sharp spectral lines.

Such objective grating designs, while simple in concept, involve some complications. Because of the weak radiation fluxes from cosmic sources, the area of typical grazing-incidence telescopes is large and usually consists of thin annuli of large diameter, and the telescopes usually have long focal lengths. For example, the AXAF grazing-incidence telescope design has a focal length of about ten meters and consists of six nested primary and secondary mirrors, the outermost of which has a diameter of about one meter. In order to take advantage of the long focal length (which directly translates into dispersion in the focal plane), the most desirable location for the transmission grating is just behind the telescope mirrors. This means that the dimensions of the grating must be almost as large as those of the telescope. In order to achieve high effective areas, the gratings must have as much open area as possible consistent with its diffracting role.

Usually, the gratings are formed by etching ectangular holes or slits in thin metal sheets. Because no known material transmits strongly in the soft X-ray/EUV wave band, the gratings cannot be mounted on a substrate and must the self-supporting. In a typical grating, long slits $-1$ $\mu$m wide are etched in a sheet of gold $-1$ $\mu$m thick, so that it is unable to endure the rigors of launch and handling if made in large unsupported areas. Some means is therefore required to strengthen the gratings in a manner which produces minimum interference with the placement of the slits. Typically, the structural integrity of the gratings is provided by a system of progressively coarser and stronger support structures overlaid and bonded onto the grating, incurring a loss of 25% to 50% of the grating throughput. Coarse structures have little impact on the diffraction pattern of the grating, but often a fine support structure is required which contains open areas only an order of magnitude or so larger than the dimension of the slits. Such fine support structures produce diffraction patterns of their own which are superposed on the desired pattern of the slits.

There are a number of computer algorithms by means of which it is possible in principle to deconvolve the true spectrum from the data. However, in practice, statistical fluctuations in the spectrum due to the low photon fluxes typical of observations in soft X-ray and EUV astronomy tend to produce increased uncertainties in the neighborhood of diffraction maxima which may mask the presence of weak spectral lines when strong lines are also present. An optimum support structure design is thus one whose artifacts are absent from the diffraction plane.

Numerous methods have been suggested in the prior art for supporting a transmission grating. They have generally been of the following three types. The one common type of grating support has taken the form of thin plastic films bonded to the grating wires. This form has yielded less than satisfactory results because the thin plastic film is found to be partially opaque to the soft X-ray and extreme ultraviolet radiation which tends to seriously degrade the overall performance of the grating.

Another method suggested in the prior art to support the transmission grating is to adopt regularly spaced horizontal and vertical supports (perpendicular to and parallel to the grating wires, respectively) and bond them to the grating wires. Such a construction has been known to yield only marginal benefits because the regular spacing of the support structure produces a diffraction pattern in the diffraction plane of the grating which tends to confuse the spectra of interest.

In a third approach taken by the prior art to support transmission gratings, researchers have adopted a random support structure which consists of randomly oriented and randomly spaced supports bonded to the grating wires. It has been found in this type of construction that the randomly oriented and spaced support structure is difficult if not impossible to be made completely random while still providing the necessary element of support and desired maximum throughput. Modifications of the randomly oriented design which were able to provide the needed support have unfortunately produced added diffraction patterns which likewise interfere with the spectra of interest.

SUMMARY OF THE INVENTION

The transmission grating support structure of the present invention consists of regularly spaced horizontal bars which are perpendicular to the grating wires and randomly spaced vertical support bars which are parallel to the grating wires. The vertical supports are regularly spaced in each row. However, in each row the vertical supports are employed advantageously by having their position relative to the position of the vertical supports in all of the other rows at a distance which is a pseudo-random integer of grating wire spacings. The arrangement embodying the invention, therefore, assigns to this pseudo-random integer (phase number), k, a number from 0 to N−1, where N is the distance from one vertical support to the other next in a single row, measured in terms of grating wire spacings. In addition, the preferred embodiment requires that the number of rows be 2MN where M is an integer. Further, the diffraction patterns above and below the diffraction plane are mirror images if the phase number, k, of row m is the same as for row 2MN−m, which is a desirable feature. In any case, the number of rows having the same phase number is restricted to 2M, that is, there are 2M rows for each value of the phase number (k=0, 1, 2, ..., N−1). This restriction guarantees that in the diffraction plane of the grating, the diffraction pattern produced by the support structure coincides with that produced by the grating wires in the diffraction plane.

Accordingly, an object of the invention is a new grating in the transmission grating field.

Another object of the invention is a novel grating support.

A further object of the invention is a transmission grating whose diffraction pattern coincides with that produced by the grating wires in the diffraction plane.

Another feature of the invention is to completely eliminate from the diffraction plane any artifacts contributed by the support structure in a transmission grating.

Still another feature characterizing the present invention is a support structure in transmission gratings altered to reduce significantly its diffraction pattern in the diffraction plane.

Other objects of the invention will become apparent from the following description of the embodiments of the present invention taken in conjunction with the accompanying drawings.

DESCRIPTION OF THE PREFERRED EMBODIMENT

Figure 1:
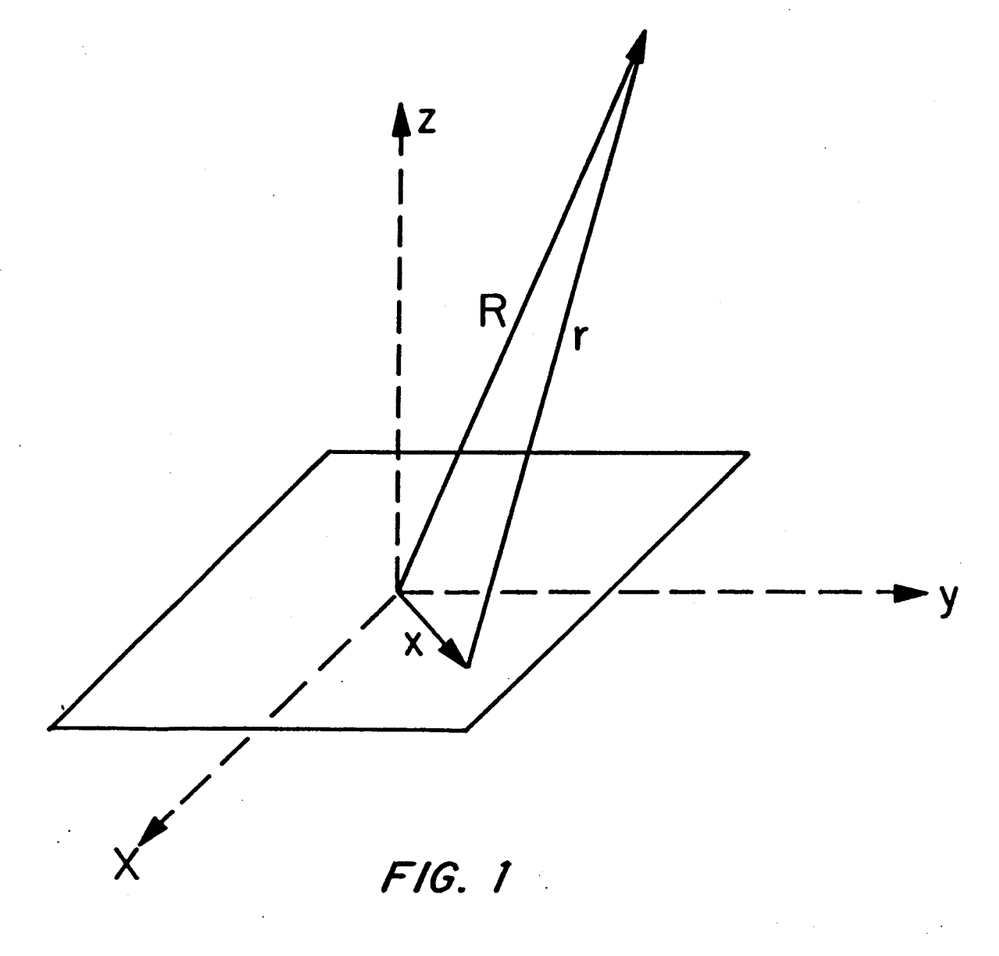
FIG. 1 is a schematic of the orientation of the grating and the relationship of the vectors R, r, and x.

Referring now to FIG. 1, consider a transmission grating consisting of a large mosaic of smaller gratings (chips) arranged in a regular pattern. A chip is defined as the smallest area of unsupported grating together with its attendant frame of support structure. We assume plane wave incident radiation perpendicular to the plane of the paper in FIG. 1 and we will concern ourselves with the far field case (Fraunhofer diffraction). The grating is oriented such that its surface lies in the x-y plane and the long dimension of the rectangular slits is parallel to the x axis. The vector x lies in the plane of the grating. We desire the diffraction pattern at points described by the vector R (from the origin in the surface of the grating) due to diffraction at points x on the grating surface, as shown in FIG. 1, where $$R = R(\sin\theta' \cos\phi' \hat{e}_x + \sin\theta' \sin\phi' \hat{e}_z) \quad (1)$$

and where $|R|$ is much larger than the dimension of the grating. For plane wave radiation incident on the grating of the form $\exp(ik.x)$, the diffracted (transmitted) radiation is of the form $\exp(ik.x + ikr)$, where r is the distance from a point (x,y) on the grating surface to the point of interest and is given by the vector $r = R - x$, and k is the wave propagation vector. For the incident radiation, we let $k = 2\pi(\cos\theta \hat{e}_z + \sin\theta \hat{e}_y)/\lambda$. Since x lies on the grating surface, $r = R - xe_x - ye_y$, so that for $R \gg x$, $$r \approx R - x\sin\theta'\cos\phi' - y\sin\theta'\sin\phi' \quad (2)$$

Then in the far field, the diffracted radiation from a single point is of the form $$\exp(ik.x+ikr) = \exp[2\pi i(R+uy+vx)/\lambda] \quad (3)$$

where $u = \sin\theta - \sin\theta' \sin\phi'$ and $u = -\sin\theta' \cos\theta'$.

Figure 2:
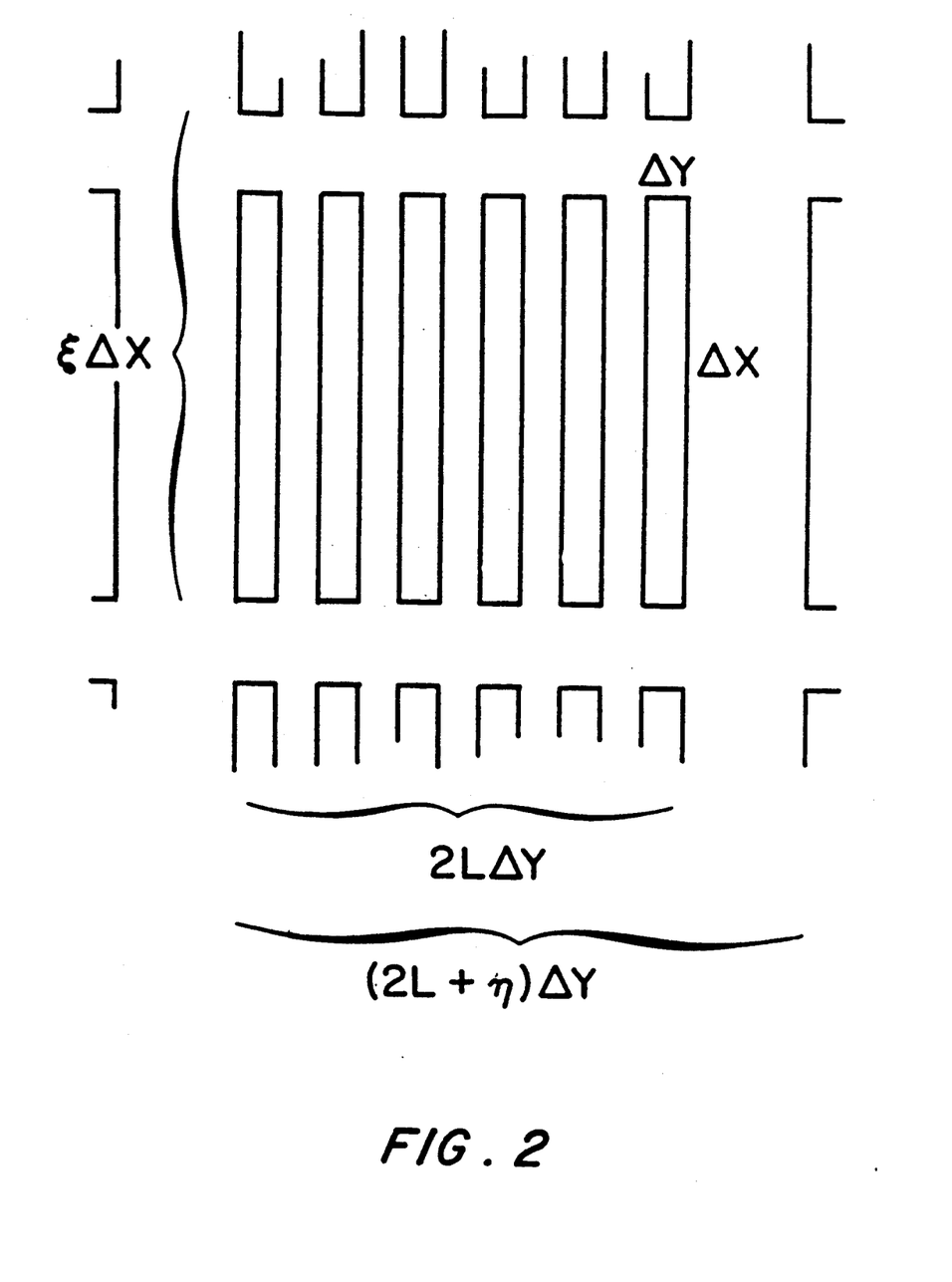
FIG. 2 is a schematic diagram of a single grating chip.

The term given in Eq. (3) must now be integrated over the open area of the grating. We first obtain the amplitude of the diffracted radiation due to a single slit:

$$A(\text{slit}) = Q \exp[2\pi i(uY+vX)](\sin\alpha/\alpha)(\sin\beta/\beta) \quad (4)$$

where $\alpha = (\pi v/\lambda)\Delta x$, $\beta = (\pi u/\lambda)\Delta y$, Q is general complex phase factor ($|Q|=1$), X and Y are the positions of the lower left-hand corner of the slit, $\Delta x$ and $\Delta y$ are the dimensions of the slit as shown in FIG. 2 and any constant terms which multiply the expression have been ignored, since only relative intensities will be considered. The intensity of the diffracted radiation due to this single slit is $$P(\text{slit}) = [A(\text{slit})]^2 \quad (5)$$
$$= (\sin\alpha/\alpha)^2 (\sin\beta/\beta)^2$$

which has maxima for $$\begin{aligned}
&\alpha = 0 \\
&\alpha = \tan\alpha;\ \alpha \approx \pm(m+3/2)\pi \\
&\beta = 0 \\
&\beta = \tan\beta;\ \beta \approx \pm(m+3/2)\pi
\end{aligned} \quad (6)$$

where m is a non-negative integer.

Each chip consists of a number of such slits and a frame contributed by the fine support structure. The width of the wires between the slits will be taken to be the same as the width of the slits, as in FIG. 2. Thus, as seen in FIG. 2, the rectangular slits are oriented parallel to the x axis, have dimensions $\Delta x$ and $\Delta y$, and are placed at periodic intervals of $2\Delta y$. The chip has dimensions $\xi\Delta x$ and $(2L+\eta)\Delta y$, where L is the number of slits in the chip. In order that the slit spacing is maintained from one chip to the next, $\eta$ is an even integer.

If we let the number of slits in each chip be L and set $Y = 2p + Y$, where $p = 0, 1, 2, \ldots, L-1$, then their total contribution to the amplitude by the chip is a factor $$\sum_{p=0}^{L-1} \exp(4\pi i p u \Delta y/\lambda) = [\exp(4\pi i L u \Delta Y/\lambda) - 1]/ \quad (7)$$
$$[\exp(4\pi i u \Delta Y/\lambda) - 1]$$
$$= Q \sin(2L\beta)/\sin(2\beta)$$

Thus, the amplitude for the chip is $$A(\text{chip}) = Q \exp[2\pi i(uY+vX)](\sin\alpha/\alpha)[\sin(2L\beta)/\sin(2\beta)] \times (\sin\beta/\beta) \quad (8)$$

where X and Y now indicate the position of the lower left-hand corner of the chip. The intensity of the diffracted radiation due to this single chip has maxima similar to those for a single slit given in Eq. (6) with additional maxima for $$\beta = n\pi/2\ \tan(2L\beta) = L\ \tan(2\beta);\ \beta = \pm(m+3/2)\pi/2L \quad (9)$$

where n is an odd integer and m is a non-negative integer.

A number of identical chips are assembled to form the mosaic grating and we must include the effects of the chip boundaries shown in FIG. 2. The mosaic is constructed from K chips in the x direction and J chips in the y direction. If the chips are assembled in register, i.e., the boundaries of the chips are aligned in both directions, and since the x dimension of each chip is $\xi\Delta x$ and the y dimension is $(2L+\eta)\Delta y = 2N\Delta y$, we set $$\begin{aligned}
X &= K\xi\Delta x \\
Y &= 2jN\Delta y
\end{aligned} \quad (10)$$

and the contribution of these KJ chips to the amplitude results in two factors, one for the y dimension, $$\sum_{j=0}^{J-1} \exp(4\pi i u j N \Delta y/\lambda) = [\exp(4\pi i u J N \Delta y/\lambda) - 1] \times \quad (11)$$
$$[\exp(4\pi i u N \Delta y/\lambda) - 1]^{-1}$$
$$= Q \sin(2JN\beta)/\sin(2N\beta)$$

and one for the x dimension $$\sum_{k=0}^{K-1} \exp(2\pi i v k \xi \Delta x/\lambda) = [\exp(2\pi i v K \xi \Delta x/\lambda) - 1] \times \quad (12)$$
$$[\exp(2\pi i v \xi \Delta x/\lambda) - 1]^{-1}$$
$$= Q \sin(K\xi\alpha)/\sin(\xi\alpha)$$

so that the amplitude for the total grating is $$A(\text{total}) = Q[\sin(K\xi\alpha)/\sin(\xi\alpha)][\sin\alpha/\alpha] \times \quad (13)$$
$$[\sin(2JN\beta)/\sin(2N\beta)][\sin(2L\beta)/\sin(2\beta)][\sin\beta/\beta]$$

The intensity of the diffracted radiation for the grating is $$P(\text{total}) = [A(\text{total})]^2 \quad (14)$$

which has maxima for $$\begin{aligned}
&\alpha = 0 \\
&\alpha \approx \pm(m+3/2)\pi \\
&\alpha = k\pi/\xi
\end{aligned}$$

$$\tan(K\xi\alpha) = K\ \tan(\xi\alpha);\ \alpha \approx \pm(m+3/2)\pi/K\xi \quad (15)$$

$$\begin{aligned}
&\beta = 0 \\
&\beta \approx \pm(m+3/2)\pi \\
&\beta = n\pi/2 \\
&\beta \approx \pm(m+3/2)\pi/2L \\
&\beta = k\pi/2N
\end{aligned} \quad (15)$$

$$\tan(2JN\beta) = J\ \tan(2N\beta);\ \beta \approx \pm(m+3/2)\pi/2NJ$$

where k is an integer, m is a non-negative integer, and n is an odd integer.

Figure 3:
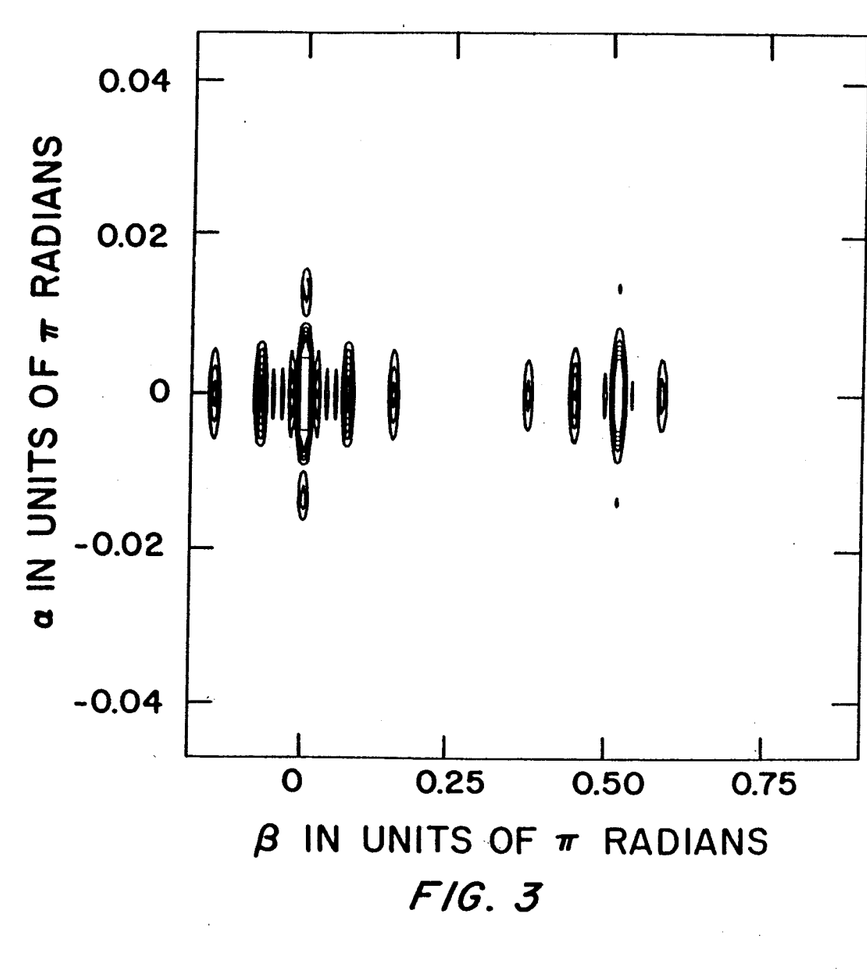
FIG. 3 represents a contour plot of the diffracted radiation for a grating with a regularly spaced support structure.
Figure 4:
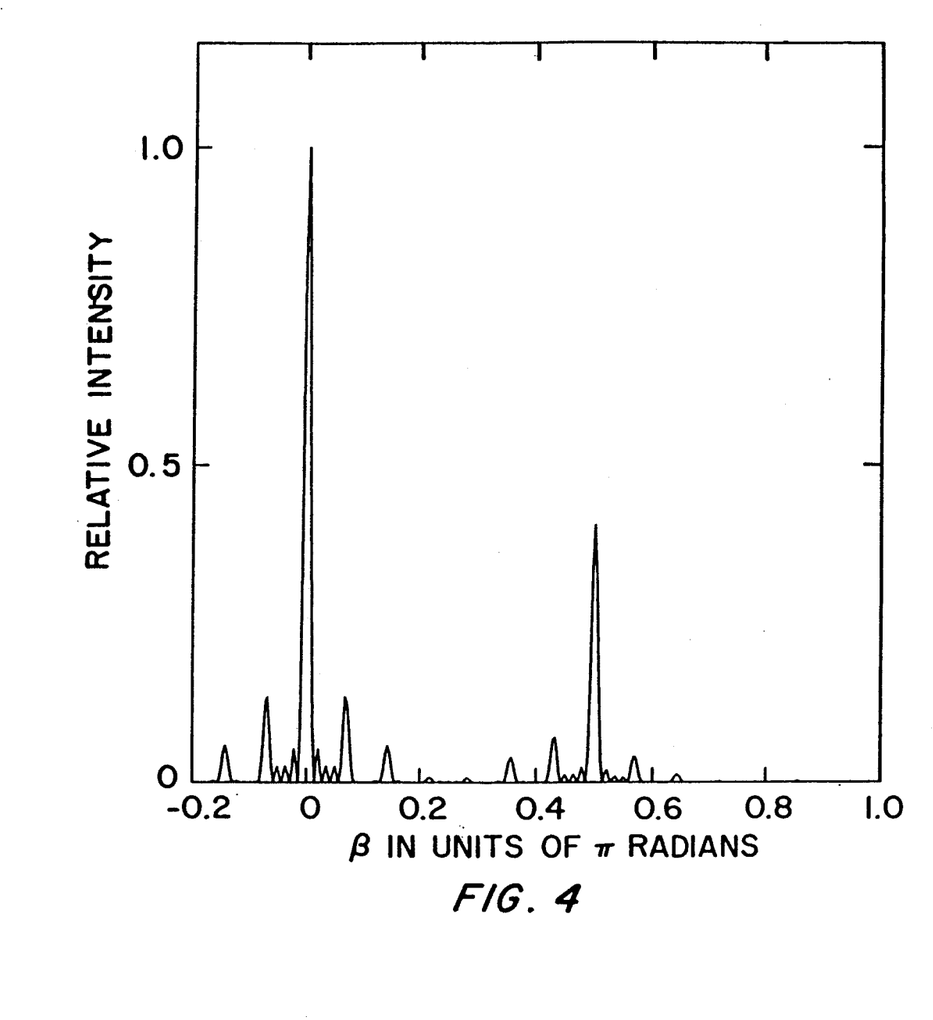
FIG. 4 shows the relative intensity in the diffraction plane for the case given in FIG. 3.

As an example, displayed in FIGS. 3 and 4 are the intensities obtained from Eqs. (13) and (14) with L=5, N=7, J=5, $\xi=1.1$ and K=98. Thus, it will be understood that in the FIG. 3 plot for the regularly spaced support structure, L=5, N=7, J=5, $\xi=1.1$ and K=98. The uppermost contour is one-tenth of the zero-order intensity and both axes are labeled in units of $\pi$ radians.

Most prominent in FIGS. 3 and 4 are the principal maxima, but there are many other maxima present as well. In particular, the relatively strong secondary maxima at values of $\beta$ which are integer multiples of −0.07π (corresponding to $\beta=k\pi/2N$) are caused by the regularly placed support structure parallel to the slits.

In investigating the maxima of Eq. (13) in more detail, the maxima of primary interest are those produced by the basic grating pattern for which $\beta=n\pi/2$ (i.e., the principal maxima). The diffraction plane is of most concern, so in the following discussion we set $\alpha=0$. We will compare each of the maxima with the zero-order case, $P(\beta=0)=(KJL)^2$, i.e, we form $P(rel)=P(\beta)/P(\beta=0)$. For $\beta=n\pi/2$, $P(rel)=(2/n\pi)^2$, so the ratio of third-order to first-order intensity is 1/9 (even-order maxima are missing). The maxima represented by $\beta \simeq \pm(m+3/2)\pi$ also are produced by the basic grating pattern (diffraction by each single slit) and approximately coincide with the third and higher-order principal maxima. The very small peaks in FIGS. 3 and 4 which occur at a relatively high frequency between the support structure maxima are a consequence of the finite size of the chips. They are located at $$\beta \simeq \pm(m+3/2)\pi/2L = n\pi/2 \pm (j+3/2)\pi/2L$$

and yield relative intensities $P(rel) \leq [1/J(j+3/2\pi)^2$ near $n=0$ and $P(rel) \leq [2/Jn(j+3/2)\pi^2]^2$ near $n \neq 0$, where L is large and $N-L<<L$. While some of these peaks are located near the principal maxima, potentially leading to line confusion in the spectrum, their contribution is small when the number of chips is large $(J>>1)$. Not shown in FIGS. 3 and 4 are a set of peaks occurring at still higher frequency, a result of the finite size of the grading. They occur at $\beta \simeq \pm(m+3/2)\pi/2NJ$ and their intensities are $P(rel) \sim [1/(j+3/2)\pi]^2$ for $n=0$ and $P(rel) \sim [1/(j+3/2)\pi]^2 [2/n\pi]^2$; for $n \neq 0$, where J is large and we let $2\beta=n\pi \pm (j+3/2)\pi/NJ$ in this calculation. Some peaks are located adjacent to the principal maxima, i.e., at $\beta = \pm 3\pi/4NJ$ and $\beta = n\pi/2 \pm \pi/4NJ$, but they are difficult to resolve for mosaic gratings of reasonable size $(NJ>>1)$ and their intensity rapidly diminishes away from the principal maxima. However, these peaks may contribute to the width of spectral lines and to the spectrum background.

The maxima which occur at $\beta=k\pi/2N$ are caused by the chip boundaries, i.e., the support structure, and they may be much more troublesome. For N large and $L=N$, we find that near the principal maxima, i.e., at $\beta = \pm \pi/2N$ and $\beta = n\pi/2 + \pi/2N$, the ratio of the intensity of these nearby peaks to that in the principal maximum is $\sim [(N-L)/L]^2$.

Typically, $N-L \sim L/5$, so it is possible for such secondary maxima of strong spectral lines to mask the presence of weak spectral lines.

The grating pattern also causes diffraction in a plane perpendicular to the diffraction plane. To demonstrate its characteristics, examine the case in which $\beta=0$ (zero order of the primary diffraction pattern), and we assume $\xi-1<<\xi$. The features occurring at $\alpha \simeq \pm(m+3/2)\pi$, are a consequence of the finite slit length and have relative intensities $P(rel)=P(\alpha)/P(\alpha=0) \sim [1/K(m+3/2)\pi]^2$, which is small for large K. The maxima at $\alpha = k\pi/\xi$ are due to the chip boundaries and result in $P(rel) \sim (\xi-1)^2$. Both of these sets of features lie outside the to boundaries of FIG. 3. The features displayed in FIG. 3 above and below the diffraction plane at $\alpha \simeq \pm(m+3/2)\pi/K\xi$ are a consequence of the finite size of the grating. Similar features, discussed above, are found in the primary diffraction plane ($\alpha=0$). For most purposes, none of the maxima occurring perpendicular to the diffraction plane are of concern.

One application for which the existence of the relatively strong maxima at $\alpha=k\pi/\xi$ would cause major difficulties is in obtaining spectra of extended sources such as supernova remnants or the sun (spectroheliograms). At present, there is no known support structure configuration which would alleviate this problem except for the obvious one of complete removal of the chip boundaries, thereby destroying the structural integrity of the grating.

RANDOMLY PLACED SUPPORT STRUCTURE

Figure 5:
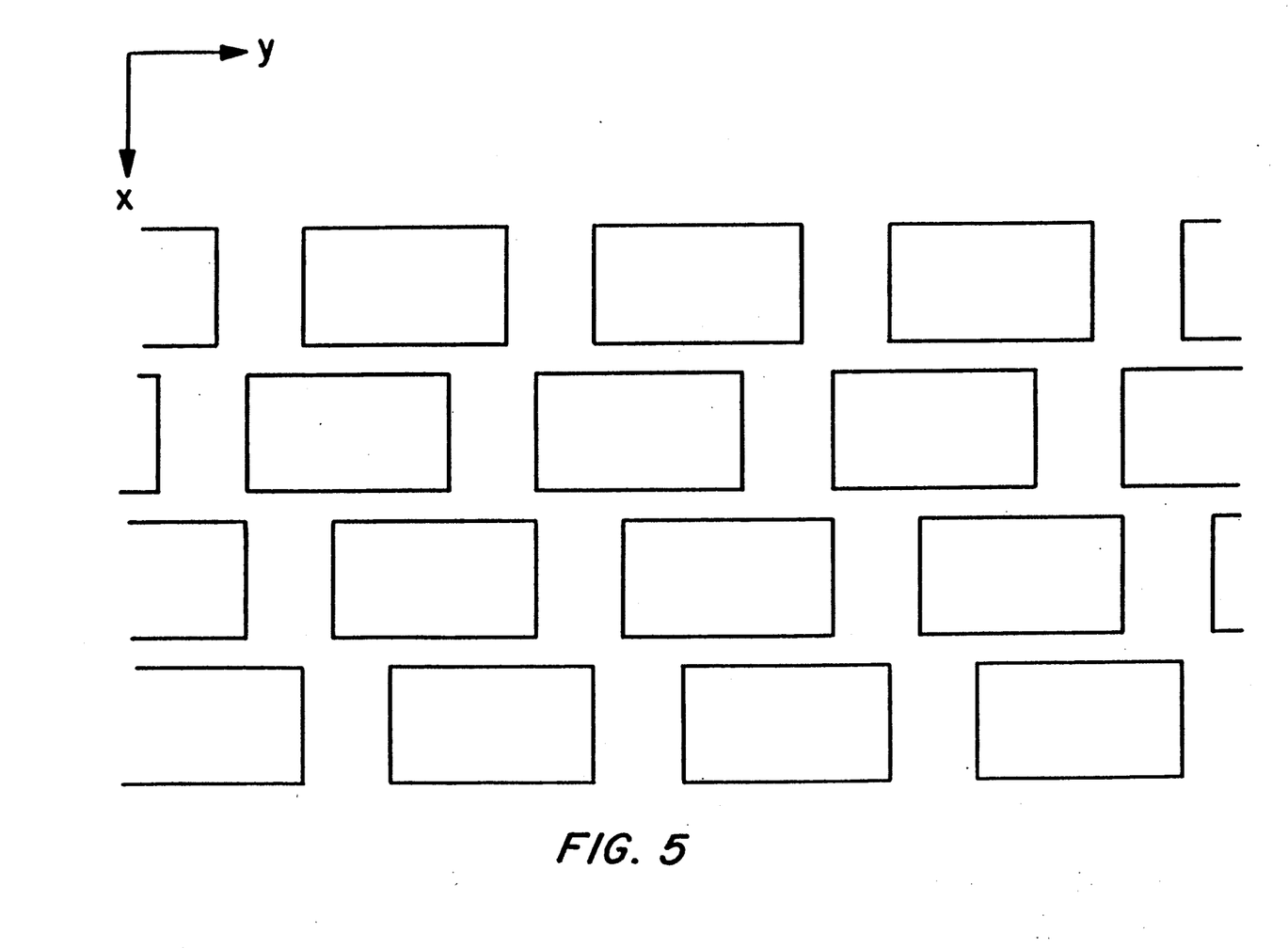
FIG. 5 illustrates an example of random placement of the supports which are parallel to the slits.

Addressed now is the problem presented by the support structure, i.e., the chip boundaries, which is parallel to the grating lines. As in Eq. (10), we set $X=k\xi\Delta x$, but we now set $Y=2jN\Delta y+Y_r$, where $Y_r$ is a random integer multiple of $2\Delta y$ distributed from 0 to $2(N-1)\Delta y$ with respect to k. The support structure may then have the form as illustrated in FIG. 5. The sum over $j=0, 1, 2, \ldots J-1$ again results in the factor given by Eq. (11). We must now represent the functional dependence of $Y_r$ on X. We set $Y_r=2f(k)\Delta y$, where f(k) is an integer chosen randomly with respect to k and, in the limit $K \to \infty$, covers the range, 0 to $N-1$, uniformly. We can represent the sum of amplitudes over all $k=0, 1, 2, \ldots K-1$ by $$\sum_{k=0}^{K-1} \exp\{2\pi i[\nu k\xi\Delta x + 2uf(k)\Delta y]/\lambda\} = \quad (16)$$

$$E(2\pi i\nu\xi\Delta x/\lambda)RF(4\pi iu\Delta y/\lambda)$$

so that the amplitude for the total grating is $$A(total) = QE(2\pi i\nu\xi\Delta x/\lambda)RF(4\pi iu\Delta y/\lambda) [\sin\alpha/\alpha] \times \quad (17)$$
$$[\sin(2NJ\beta)/\sin(2N\beta)] [\sin(2L\beta)/\sin(2\beta)] [\sin\beta/\beta]$$

where $E(2\pi i\nu\xi\Delta x/\lambda)$ is a row matrix of K elements, each of which is of the form $\exp(2\pi ik\nu\xi\Delta x/\lambda)$ ($k=0, 1, 2 \ldots K-1$), $F(4\pi iu+iu\Delta y/\lambda)$ is a column matrix of n elements, each of which is of the form $\exp(4\pi imu\Delta y/\lambda)$ ($m=0, 1, 2, \ldots N-1$), and R is a K row, N column, random matrix whose elements consist of 1's and 0's placed in such a way that there is only one 1 in each row and, on the average, K/N 1's in each column. We will average over all possible distinct R matrices to obtain an expectation value of the amplitude. Thus, if there are M such distinct R matrices, there will be M amplitudes and the average of the amplitude given by Eq. (16) is $$<A> = (1/M) \sum_{m=1}^{M} E(2\pi i\nu\xi\Delta x/\lambda)R_m F(4\pi iu\Delta y/\lambda) \quad (18)$$

Now, while M of the R matrices are distinct, only N of them can influence a single row, since N of them will fill a single row with ones when summed. Thus we take $$<A> = (1/N) E(2\pi i\nu\xi\Delta x/\lambda) R_{sum} F(4\pi iu\Delta y/\lambda) \quad (19)$$

where $R_{sum}$ is a K by N matrix consisting of all 1's. The average of the amplitudes can then be written as $$<A> = (1/N)\left[\sum_{k=0}^{K-1} \exp(2\pi ikv\xi\Delta x/\lambda)\right]\left[\sum_{m=0}^{N-1} \exp(4\pi ium\Delta y/\lambda)\right] \quad (20)$$

$$= (1/N)Q[\sin(K\xi\alpha)/\sin(\xi\alpha)] [\sin(2N\beta)/\sin(2\beta)]$$

Thus, the expectation value of the amplitude for the total grating becomes $$<A(\text{total})> = (1/N)Q[\sin(K\xi\alpha)/\sin(\xi\alpha)][\sin\alpha/\alpha] \times \quad (21)$$
$$[\sin(2NJ\beta)/\sin(2\beta)] [\sin(2L\beta)/\sin(2\beta)] [\sin\beta/\beta]$$

As expected, the behavior of the maxima perpendicular to the diffraction plane is the same as obtained hereinabove in the regularly spaced support structure cases, but in the diffraction plane, some of the maxima have been removed. The expected intensity in the diffraction plane (setting $\alpha=0$) is $$P=(K/N)^2 [\sin(2NJ\beta)/\sin(2N\beta)]^2$$
$$\lambda\sin(2L\beta)/\sin(2\beta)]^2 [\sin\beta/\beta]^2 \quad (22)$$

for which maxima occur at $$\beta = 0 \quad (23)$$
$$\beta \approx \pm(m + 3/2)\pi$$
$$\beta = n\pi/2$$
$$\beta \approx \pm(m + 3/2)\pi/2L$$
$$\beta \approx \pm(m + 3/2)\pi/2NJ$$

Except for the removed maxima at $\beta=k\pi/2N$, which were produced by the chip boundaries, these are the same as those which occurred in the regular case and produce much the same peak intensities. One exception is the intensity of the maxima located at $\beta\approx\pm(m+3/2)\pi/2L=n\pi/2\pm(j+3/2)\pi/2L$ resulting from the sets of slits which constitute a chip. The relative intensities, satisfying $P(\text{rel})<(1/J)^2 [1/(j+3/2)\pi]^4$ near the zero-order principal maximum and $P(\text{rel})<(2/J n\pi) [1(j+3/2)\pi^2]^4$ near the nonzero principal maxima, are smaller than in the regular case.

Thus, randomizing the support structure (as in FIG. 5, for example) removes the support structure diffraction pattern in this average case, where we have calculated the expected value of amplitude, and diminishes the diffraction peaks caused by the finite size of the chip. In practice, however, this idealization will not be realized because of statistical fluctuations in the placement of the ones and zeros in the random matrix of Eq. (17), but the intensity of the support structure diffraction pattern is diminished significantly by the random orientation.

Figure 6A:
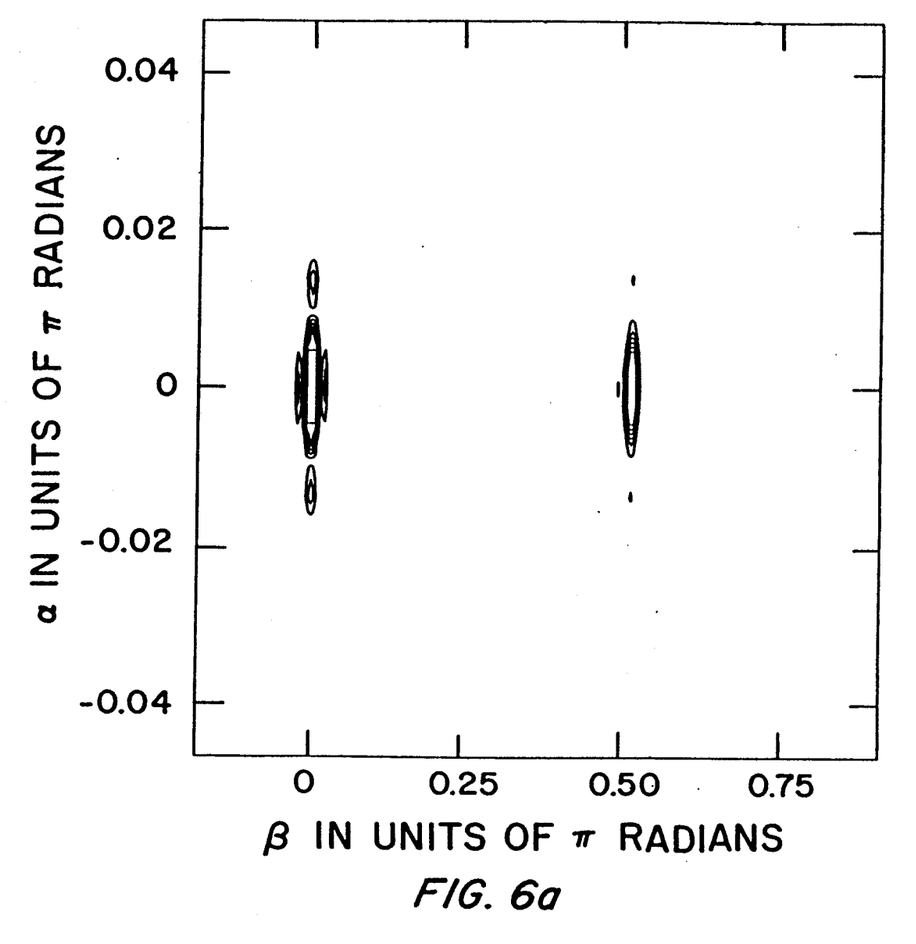
FIG. 6a represents a contour plot of the intensity of the diffracted radiation from a grating in which the supports parallel to the slits are randomly placed, in which the contour is one-tenth of the zero order intensity.
Figure 6B:
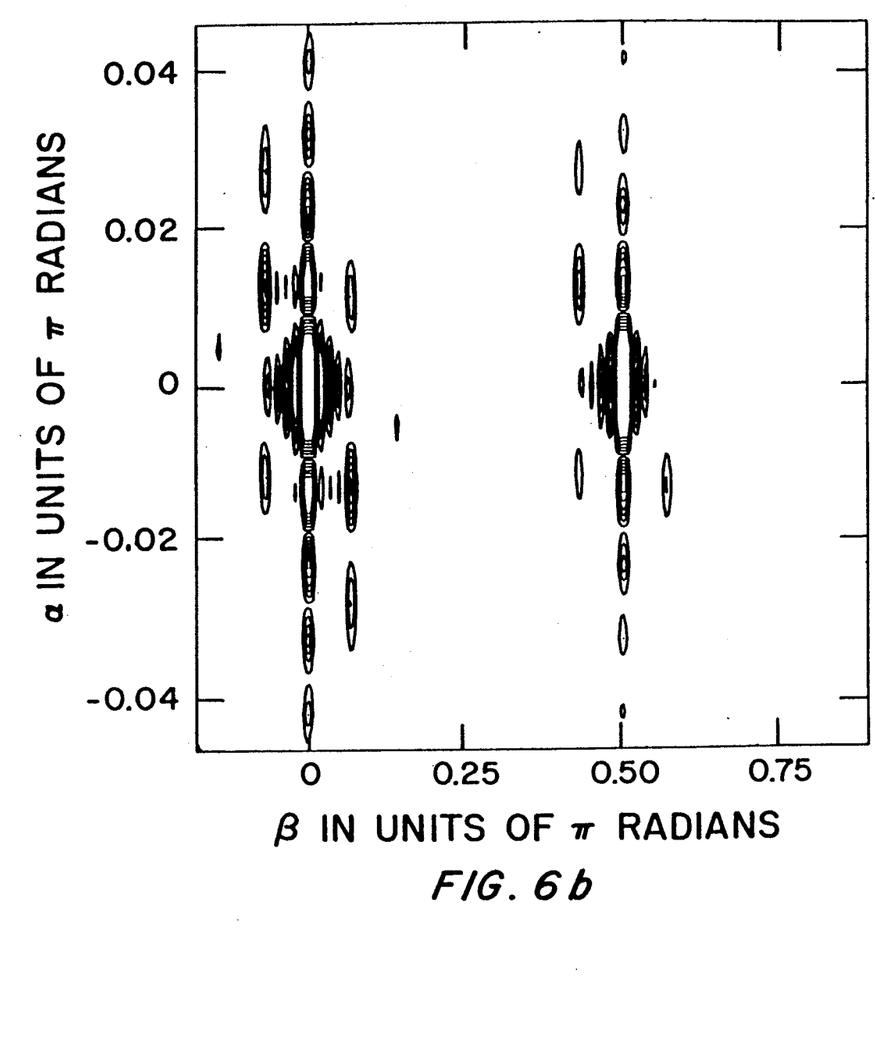
FIG. 6b is essentially the same as the contour plot illustrated in FIG. 6a, but in which the weak features are emphasized and the uppermost contour is one-hundredth of the zero order intensity.
Figure 7:
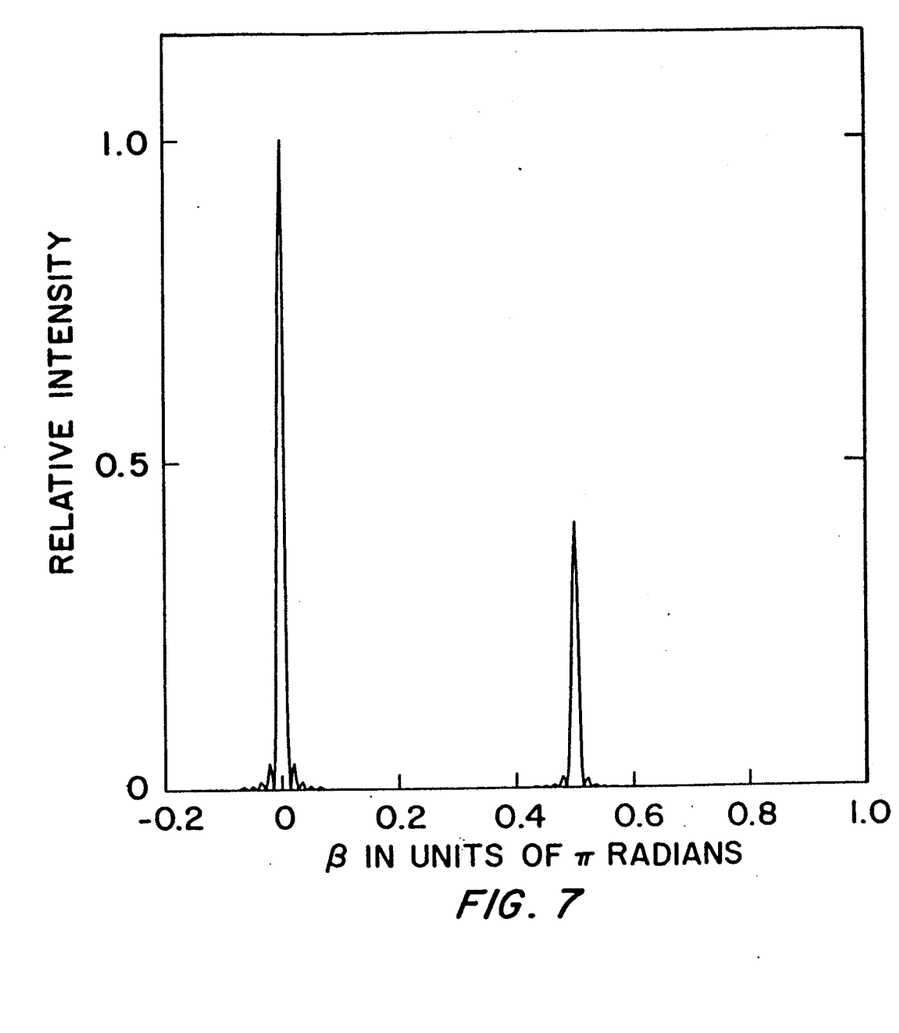
FIG. 7 shows the relative intensity of the diffraction radiation in the diffraction plane for the random cases given in in FIGS. 6a and 6b.

In FIGS. 6a, 6b and 7, the intensity produced from the amplitude given by the random support structure represented by Eq. (17) is displayed. FIGS. 6(a) and 7 may be compared with FIGS. 3 and 4, respectively. Also, it will be understood in the interpretation of FIGS. 6a and 6b that L=5, N=7, J=5, $\xi=1.1$, and K=98. The effect of the random placement of the support structure is evident in FIGS. 6 and 7, since the maxima due to the supports parallel to the slits are much reduced in the diffraction plane. While the intensities displayed in these figures show very low maxima at $\beta=k\pi/2N$ in the diffraction plane, as mentioned above, some combinations of randomly placed supports will give larger maxima. FIG. 6(b) emphasizes the weaker features in the diffraction image. Many of the secondary maxima result from the fact that the calculation of the intensity involved only a small number of chips, but some of the secondary maxima are due to the support structure and are most prominent out of the diffraction plane.

PSEUDO-RANDOMLY PLACED SUPPORT STRUCTURE

In accordance with a preferred embodiment of the invention, it is possible, by a suitable choice of the structure spacing, to completely eliminate the support structure artifacts from the diffraction plane. Pseudo-random spacing is the term adopted herein to express this phenomenon. In the general case [see Eqs. (16) and (17)], the amplitude of the diffraction pattern can be written as $$A(\text{total})=QT [\sin \alpha/\alpha$$
$$][\sin(2NJ\beta)/\sin(2N\beta)][\sin(2L\beta)/\sin(2\beta)]\times-$$
$$[\sin\beta/\beta] \quad (24)$$

where $$T = \sum_{k=0}^{K-1} \exp[2ik\xi\alpha + 4i\beta f(k)] \quad (25)$$

and where f(k) is an integer which assumes values from 0 to N−1.

We seek those f(k) which remove the $\beta=k\pi/2N$ maxima caused by supports parallel to the slits. We make K an integer multiple of N, so that there are K/N blocks, each of which contains N rows of chips. In each block, a value of f(k) from 0 to N−1 is selected for each row subject to the restriction that, once selected, that value of f(k) is not available for assignment to another row in the same block. Thus in the whole grating, K/N rows will be found for which f(k)=0, and K/N rows for which f(k)=1, and so forth. In such conditions and for $\xi\alpha$ equal to an integer multiple of $\pi$, Eq. (25) reduces to $$T(\xi\alpha=j\pi)=(K/N) Q [\sin(2\beta N)/\sin(2\beta)] \quad (26)$$

which is zero for all $\beta=k\pi/2N$ provided K is not also an integer multiple of N. Note that for $\xi\alpha=j\pi$, the order of the terms containing the f(k) values in Eq. (25) is immaterial, i.e., once the f(k) values have been chosen for each row of chips, interchanging rows has no impact on the result given in Eq. (26).

The condition $\xi\alpha=j\pi$ restricts the above results to the diffraction plane and to the parallel planes which contain the principal maxima of the support structure members lying perpendicular to the slits. However maxima may be produced elsewhere, e.g., by a very ordered selection of f(k) in each block, which gives the support structure a visible diagonal pattern. In addition, we have not considered conditions at the secondary maxima represented by $\xi=p\pi/2N$, where we would also like to produce the condition $T \propto \sin(2\beta N)$. We are unable to determine values of f(k) which eliminate all maxima of the support structure which is parallel to the slits and still maintain structural integrity of the grating, but this ideal may be approached by selecting the f(k) at random in each block, i.e., in a manner analogous to selecting N numbered balls from an urn without replacement. This is the basis for the pseudo-random support structure in accordance with the invention.

Figure 8:
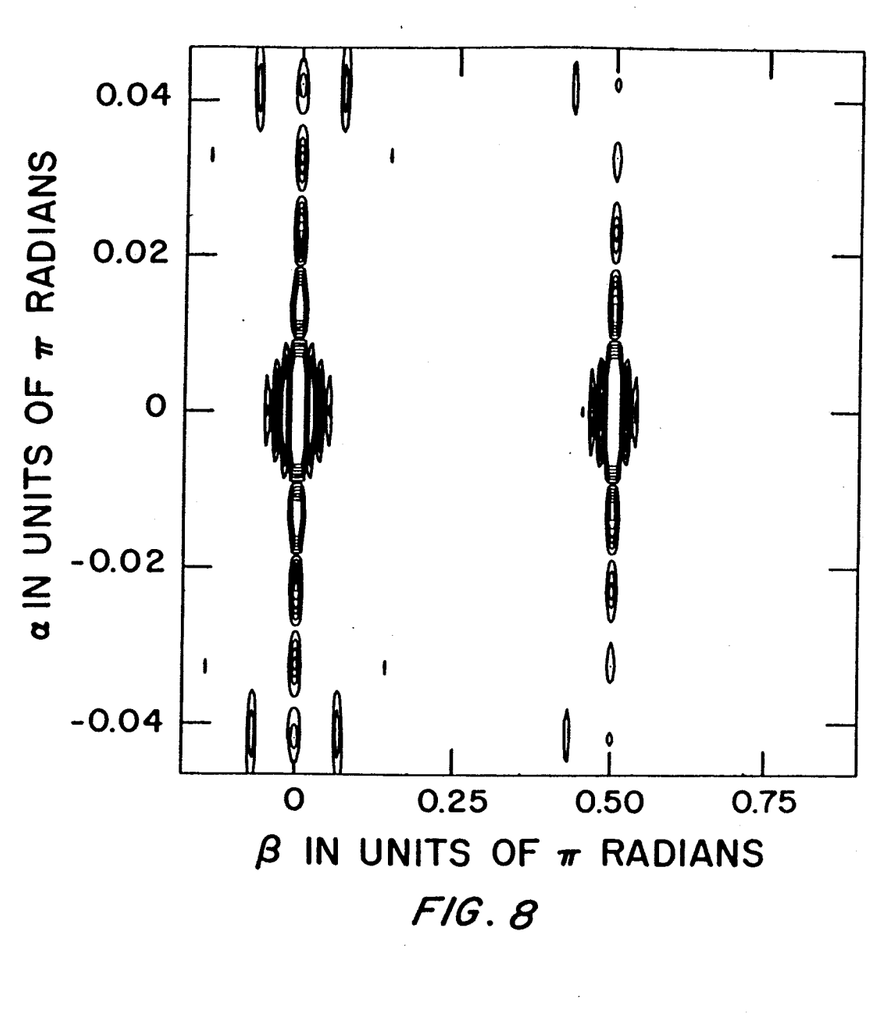
FIG. 8 represents a contour plot of the intensity of the diffracted radiation from a grating in accordance with the invention in which the supports parallel to the slits are pseudo-randomly placed.

FIG. 8 displays the diffraction pattern in the neighborhood of the diffraction plane for a pseudo-random support structure. As was described for the earlier case, $L=5$, $N=7$, $J=5$, $\xi=1.1$ and $K=98$. The uppermost contour is 1/100 of the zero-order intensity. Most prominent are the principal maxima, and we see that the maxima in FIGS. 3 and 4 caused by the regularly placed support structure parallel to the slits have been completely removed from the diffraction plane. In addition, some of the secondary maxima appearing in FIG. 6 (especially those near the diffraction plane and for which $\beta=k\pi/2N$) are missing. In the diffraction plane, the intensity is almost identical to that shown in FIG. 7 on the scale of that figure.

The method for choosing the phase numbers k in order to achieve complete suppression of the artifacts introduced by the vertical support strips may comprise a variety of selections capable of controlling the diffraction pattern produced by the support structure. While variation in the random parameters may be considerable, the method of the pseudo-random selection and the resultant total elimination of the support structure diffraction pattern is set forth as follows:

1. Create an array of numbers j(m) for which j(m)=mod(m); i.e., for $m = 0, 1 \ldots N - 1$, $j(m) = m$
for $m = N, N + 1 \ldots, 2N - 1$, $j(m) = m - N$
for $m = 2N, 2N + 1, \ldots, 3N - 1$, $j(m) = m - 2N$
etc. for all $m = 0, 1, 2, \ldots, MN - 1$ where $M$ is an integer 2. Choose a random integer $0 \leq n < MN$. Then for the first row, $K = j(n)$.

3. Create a new array from the old in which j(n) is missing, i.e., replace the old j(n), j(n+1), ..., j(MN-2) with j(n+1), J(n+2) ..., j(MN-1) so that the new (primed) array consists of j'(n-1)=j (n-1), j'(n)=j(n+1), ... j'(MN-2)=j(MN-1).

4. Choose a random number $0 \leq n'$, MN-1.

5. For the second row, let $k = j'(n')$.

6. Create a new array.

7. Repeat steps d, e and f until the array is empty.

It should be recognized that in carrying out the above method, each iteration produces a k (phase number) for a row and reduces the array size by one entry. As explained hereinabove, the process may be compared to drawing numbers out of a hat without making a replacement. In this way, the process produces exactly M rows for each value of k. The advantageous feature of the invention of pseudo-random placement of the vertical support bars is to eliminate their diffraction pattern from the diffraction plane.

Manufacture of such a grating is very difficult. By far the simplest construction is the one for which all the chip boundaries are in register, but as we have seen, undesirable artifacts result. On the other hand, the random or pseudo-random support structure described above demands that for each of K chip boundaries in the x direction, there are N possible choices for the corresponding y direction chip boundary (supports parallel to the slits). Therefore, construction of such a grating and predicting its response to vibration or acoustic noise may be difficult, and calculation of the diffraction pattern is likely to require large amounts of computer time.

A compromise can be reached whereby the support structure pattern is repeated every 2N Δx in the x direction. (We use 2N because we desire symmetry with respect to the diffraction plane.) Under such circumstances, the factor T given in Eq. (25) becomes $$T = Q[\sin(K\xi a/2N)/\sin(\xi a)] \sum_{k=0}^{2N-1} \exp[2ik\xi a + 4\beta f(k)] \quad (27)$$

In order that the diffraction pattern be symmetric with respect to the diffraction plane, $f(k)=f(2N-1-k)$. Therefore, we may express T as $$T = 2Q[\sin(K\xi a/2N)/\sin(\xi a)] \sum_{k=0}^{N-1} \exp[4i\beta f(k)] \times \quad (28)$$

$$\cos[\xi a(2k - N + 1)]$$

For $\xi a = m\pi$ and if the values of f(k) are 0, 1, 2, ... N−1, although not necessarily in that order, T is again given by Eq. (26), i.e., the undesirable $\beta=k\pi/2N$ maxima caused by the support structure will not be present in the intensity pattern.

Figure 9:
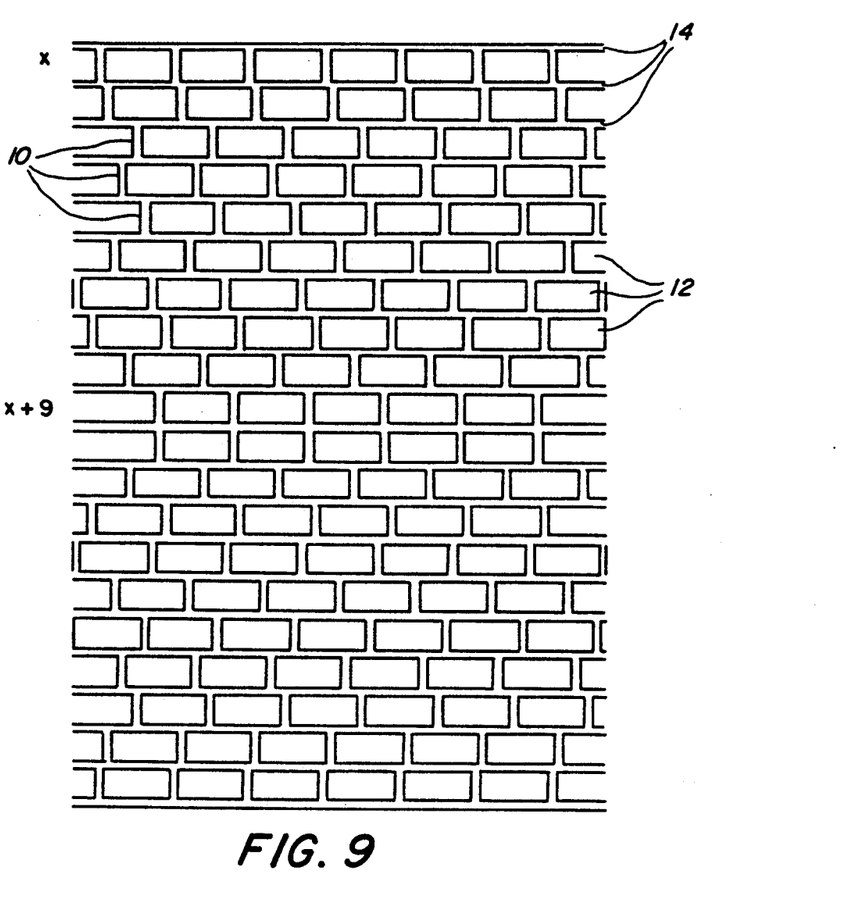
FIG. 9 shows a diffraction grating according to the invention in which the position of the vertical supports relative to all of the other rows in a distance which is a pseudo-random integer of grating wire spacings.
Figure 10:
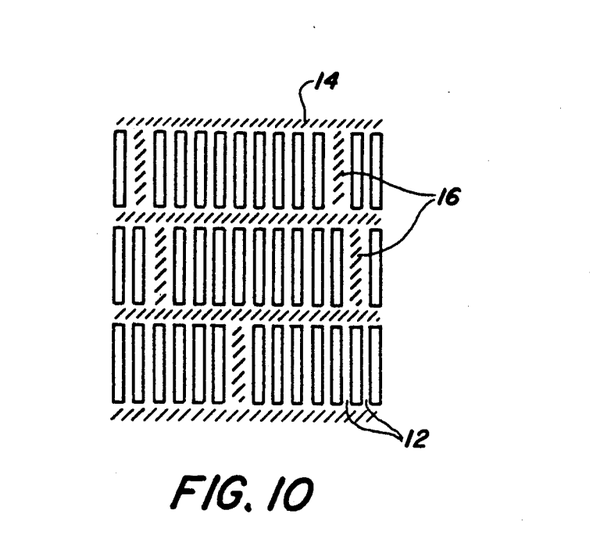
FIG. 10 is a portion of the grating illustrated in FIG. 9 magnified to better illustrate the arrangement of the wires relative to the horizontal and vertical supports.

Reference being made to FIG. 9, there is shown generally designated by the reference character 10 a diffraction grating for producing a diffraction pattern essentially free of degradation caused by the grating support. The grating 10 comprises a number of fine, equidistant and parallel lines 12 consisting of opaque wires a few microns each in thickness. The wires are separated by clear spaces which spacing is critical to the performance of the grating. Because the grating embodying the invention is not ruled on a substrate or base, support for the wires 12 is provided by regularly spaced horizontal bars 14 disposed perpendicular to the wires 12, and by vertical supports 16 arranged at right angles to the bars 14, but parallel to the wires 12 of the grating. Attachment of the wires 12 to the bars 14, and attachment of the vertical supports 16 to the bars 14, leads to the construction of a grating apparatus useful for obtaining spectra in the extreme ultraviolet and soft X-ray regions of the spectrum.

It will readily be appreciated from FIG. 9 that while the wires 12 and the bars 14 follow a pattern of regular spacing of their respective components, the vertical supports 16 which lie parallel to the grating wires 12 are arranged in a different pattern. It is essential for an appreciation of the pseudo-random structure of the invention to understand that within each row of bars 16, as viewed from left to right in FIG. 9, that is, transversely of the wires 12, the spacing of the bars 16 is such that the number of wire spacings between any two adjacent bars 16 is the same. On the other hand, in each row occupied by vertical supports, the position of the supports 16 relative to the position of the vertical supports in all other rows is maintained at a distance which is a pseudo-random integer of the spacings between the wires 12. The amplitude of the diffraction pattern thus may be written in accordance with equations (24) and 25) hereinabove, where f(k) is an integer which assumes values from 0 to N−1. Under such conditions, all artifacts produced by the vertical bars 16 are eliminated from the diffraction plane.

It may be desirable to view FIG. 9 from another perspective in order to better appreciate the unique features of the pseudo-random support structure in accordance with the invention. Thus, in FIG. 9, it is convenient to assign the letter x to identify a point to the left of the first row beginning at the upper left-hand corner of the grating 10. A second point at x+9 identifies the beginning of the tenth row, where N=10. As viewed in FIG. 9, the first vertical support 16 seen in row 1 is disposed three wire spacings inwardly from the left margin of the grating 10. In row 2, four wire spacings may be counted, etc. The spacing arrangement for all ten rows, indexed to point x, is as follows:

| PSEUDO-RANDOM SUPPORT STRUCTURE | |
|---|---|
| Row | Spacings |
| 1 | 3 |
| 2 | 4 |
| 3 | 8 |
| 4 | 6 |
| 5 | 9 |
| 6 | 5 |
| 7 | 0 |
| 8 | 2 |
| 9 | 7 |
| 0 | 1 |

Note in FIG. 9 that as a result of the pseudo-random spacing of the vertical supports 16, any one of the supports 16, irrespective of the row i which it is located within the framework N=10, is vertically misaligned with any one of the supports 16 in all of the other nine rows. Stated differently, and as viewed in FIG. 9, each of the vertical supports 16 is the sole occupant of a line drawn parallel to the wires 12 and extending vertically through rows 1-10. The pattern may optionally be chosen to repeat itself in the next N−number rows of the array. As illustrated in FIG. 9, for example, the next group of N rows is effectively the mirror image of the first ten rows and is symmetric about the diffraction plane.

It will be pointed out by way of summary that means have been devised by which the support structure of transmission gratings may be altered to reduce significantly or remove their diffraction pattern in the diffraction plane. In the first means suggested, the supports parallel to the slits are arranged completed randomly int he direction of the primary diffraction. On the average, this removes support structure diffraction effects by destroying their coherence. However, the best result among the statistical possibilities must be found by trial and error. The second method in accordance with the invention places the supports in a pseudo-random fashion which ensures that the undesirable diffraction effects of the supports are totally absent from the diffraction plane. Manufacture of such grating support structures is difficult in both cases because each chip has a randomly chosen position in the grating. A novel method embodying the invention is to pseudo-randomly place the supports parallel to the slits in only a subset of the grating mosaic, and then to repeat this pattern over the entire grating. The support structure in this last method contributes diffraction maxima to regions out of the diffraction plane, but in this plane none of the artifacts of the support structure appear. Its manufacture is much simpler than that of the other approaches and facilitates computer calculations of the expected diffraction pattern. A grating manufactured as taught by this invention could be fabricated from discrete wires and support structure adhered to one another or formed from a single piece of material. For the purposes of this invention, the wires of either structure are to be considered "bound" to the support structure, and the elements of the support structure are "attached" to each other.

A diffraction grating manufactured as taught by this invention is applicable to any use requiring spectrometry of EUV and soft X-rays. Such applications would include astronomy and high energy plasma physics.

In the three cases considered hereinabove, it will be understood that the support structure bars perpendicular to the grating slits, that is, the horizontal members, have been regularly placed and therefore the diffraction pattern of these members is still present. However, it is of no major concern since their first- and higher-order maxima in no way confuse the spectral interpretation of the overall image.

It will be understood that the invention is not limited to the embodiments described above, it being apparent to those skilled in the art that various changes and modifications may be made without departing from the spirit of the invention or the scope of the appended claims.

I claim:

1. A support structure for spectral analysis comprising:
   a diffraction grating of equidistantly spaced wires arranged in parallel with each other;
   horizontal bars equidistantly spaced with respect to each other and aligned perpendicular to said grating wires in a plurality of 2MN-parallel rows, where M and N are integers and where N is the distance from one vertical support to the next support in a single row, measured in terms of the number of wire spacings lying between adjacent ones of said vertical supports;
   said horizontal bars bonded to said grating thereby structurally contributing to the support of said wires;
   vertical supports bonded to adjacent ones of said horizontal bars and aligned parallel to said wires;
   said vertical supports being equidistantly spaced relative to each other in each of said rows and having their positions relative to each vertical support in all of the other rows determined by a pseudo-random integer of the spacings between said wires.

2. The support structure of claim 1 wherein said integer is a number from 0 to N−1.

3. A method of substantially eliminating the artifacts generated by the support structure matrix in a transmission grating diffraction plane comprising the steps of:
   preparing a grating of equidistantly spaced wires;
   structurally supporting said wires with a matrix of horizontal bars and vertical supports arranged so as to form a plurality of horizontal rows;
   spacing the horizontal supports at regular intervals relative to each other;
   spacing the vertical bars in a regular pattern relative to each other in each row and in a pseudo-random pattern relative to vertical bars in each of the other rows;
   and attaching each of said vertical supports at the ends thereof to adjacent ones of said horizontal bars.

4. A method according to claim 3 wherein said step of pseudo-randomly spacing said parallel supports includes selecting a pseudo-random integer k, as a number from 0 to N−1, where N is the distance from one vertical support to the next measured in terms of the number of wire spacings lying between adjacent ones of said vertical supports.

5. A method according to claim 4, wherein said step to select k is performed by (a) Creating an array of numbers j(m) for which j(m)=mod (m) i.e., :
for m=0,1 ... N−1, j(m)=m
for m=N,N+1 ..., 2N−1, j(m)=m−N
for m=2N,2N+1, ..., 3N−1, j(m)=m−2N
etc. for all m=0,1,2, ..., [L] MN−1 where M is an integer;

(b) Choose a random integer $0 \leq n < [L]MN$, and for the first row, K=j(n);

(c) Create a new array from the old in which j(n) is missing, i.e., replace the old J(n), j(n+1), ..., j([L]MN−2) with j(n+1), J(n+2) ..., j([L]MN−1) so that the new (primed) array consists of j'(n−1)=j(n−1), j'(n)=j(n+1), ... j'([L]MN−2)=j([L]MN−1);

(d) Choose a random number $0 \leq n'$, [L]MN−1;

(e) For the second row, let k=j'(n');

(f) Create a new array; and (g) Repeat steps d, e, and f until the array is empty.

* * * * *